United States Patent
Cho

(10) Patent No.: US 6,895,833 B2
(45) Date of Patent: May 24, 2005

(54) SHIFT-LEVER APPARATUS OF AN AUTOMATIC TRANSMISSION FOR ENABLING MANUAL MODE OPERATION

(75) Inventor: Yang-Rae Cho, Hwaseong (KR)

(73) Assignee: Hyundai Motor Company, Seoul (KR)

(*) Notice: Subject to any disclaimer, the term of this patent is extended or adjusted under 35 U.S.C. 154(b) by 185 days.

(21) Appl. No.: 10/315,778

(22) Filed: Dec. 10, 2002

(65) Prior Publication Data

US 2004/0000210 A1 Jan. 1, 2004

(30) Foreign Application Priority Data

Jun. 27, 2002 (KR) .......................... 2002-36395

(51) Int. Cl.$^7$ ............................................. B60K 20/00
(52) U.S. Cl. ................. 74/473.18; 74/473.12; 74/473.21; 74/473.33
(58) Field of Search ................. 74/473.12, 473.18, 74/473.21, 473.3, 473.31, 473.33

(56) References Cited

U.S. PATENT DOCUMENTS

| | | | | |
|---|---|---|---|---|
| 5,406,860 A | * | 4/1995 | Easton et al. ................. 74/335 |
| 6,192,770 B1 | * | 2/2001 | Miyoshi et al. ......... 74/473.18 |
| 6,196,080 B1 | * | 3/2001 | Lee ......................... 74/473.18 |
| 6,230,579 B1 | * | 5/2001 | Reasoner et al. ........ 74/473.18 |
| 6,401,564 B1 | * | 6/2002 | Lee ......................... 74/473.18 |
| 6,422,106 B1 | * | 7/2002 | Lee ......................... 74/473.18 |
| 6,536,299 B2 | * | 3/2003 | Kim ........................ 74/473.18 |

FOREIGN PATENT DOCUMENTS

| | | |
|---|---|---|
| DE | 4029 330 | 9/1990 |
| DE | 694 10817 | 8/1996 |
| DE | 100 22433 | 9/2000 |
| DE | 199 24238 | 11/2000 |

* cited by examiner

Primary Examiner—David A. Bucci
Assistant Examiner—Timothy McAnulty
(74) Attorney, Agent, or Firm—Morgan Lewis & Bockius LLP

(57) ABSTRACT

The shift-lever apparatus of an automatic transmission for enabling manual mode operation includes a housing, a shift-lever connected to a rotating unit disposed at a lower portion of the housing such that the shift-lever can rotate about the rotating unit, and a base member fixed to the shift-lever and enclosed by the housing, such that the base member moves according to the movement of the shift-lever. The apparatus also includes "+" and "−" switches, each being disposed at either side of the base member, such that the "+" and "−" switches are selectively operated according to the movement of the shift-lever. Finally, the apparatus includes a switch operating unit disposed at the base member such that the switch operating unit selectively presses the "+" and "−" switches.

14 Claims, 4 Drawing Sheets

SHIFT-LEVER APPARATUS OF AN AUTOMATIC TRANSMISSION FOR ENABLING MANUAL MODE OPERATION

FIELD OF THE INVENTION

The present invention relates to a shift-lever apparatus of an automatic transmission for enabling manual mode operation, and more particularly, to a shift-lever apparatus whose switch-operating mechanism is modularized.

BACKGROUND OF THE INVENTION

In general, an automatic transmission automatically changes shift-speed based on driving circumstances according to predetermined shift-patterns. Only common driving conditions are taken into consideration in current shift-patterns, and therefore, in some situations the shift-speed automatically engaged by the automatic transmission is not satisfactory to a driver. Although a lot of research on shift-patterns has taken place to minimize the occurrence of inappropriate shifting in such situations, new shift-patterns do not always satisfy every driver. Accordingly, a manual mode for an automatic transmission has been introduced. This manual mode enables manual shifting by sensing a driver request to shift speeds and accordingly, changing shift-speeds.

Current mechanisms for enabling manual mode operation of an automatic transmission contain a plurality of un-modularized components, which makes the structure of these mechanisms complex and increases manufacturing costs.

The information discussed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An exemplary shift-lever apparatus according to the present invention includes: a housing; a shift-lever connected to a rotating unit disposed at a lower portion of the housing such that the shift-lever can rotate about the rotating unit; a base member fixed to the shift-lever and enclosed by the housing such that the base member moves according to the movement of the shift-lever; "+" and "−" switches being respectively disposed at either side of the base member such that the "+" and "−" switches are selectively operated according to movement of the shift-lever; and a switch operating unit disposed at the base member such that the switch operating unit selectively presses the "+" and "−" switches. Preferably, a manual mode switch is disposed at the base member such that the manual mode switch operates in a manual mode.

In a further embodiment, the rotating unit includes: a hinge shaft mounted at a lower portion of the housing in a direction perpendicular to motion of the shift-lever, and a base block rotatably supported by the hinge shaft for rotatably supporting the base member. In yet another embodiment, the switch operating unit includes: a pressing plate, mounted to an upper portion of the base member, for selectively pressing the "+" and "−" switches according to left and right movement of the shift-lever. The switch operating unit also preferably includes a spring, mounted at the pressing plate, for providing restoring force thereto. More preferably, a locking member is fixed to the housing and penetrates the pressing member to restrict motion. Also preferably, a cover is mounted to the base member for covering the "+" and "−" switches and the switch operating unit.

Another exemplary shift-lever apparatus useful with the present invention includes: a housing; a shift-lever rotatably mounted to the housing, being rotatable in a predetermined direction; a base member fixed to the shift-lever; first and second switches fixed to the base member apart from each other in the predetermined direction; a pressing member mounted on the base member between the first and second switches such that the pressing member can move relative to the base member; an elastic member, abutted by both the pressing member and the base member, for providing restoring force to diminish the relative movement between the pressing member and the base member; and a locking member for limiting a relative movement between the pressing member and the housing.

Further, according to the invention the shift-lever apparatus of an automatic includes a housing, a shift-lever, a base member, a rotating unit, and up-shifting and down-shifting switches. The base member is coupled to the shift-lever within the housing and is configured to translate along with the shift-lever. The rotating unit is rotatably coupled to both a lower portion of the housing and to the base member. The rotating unit and the base member can rotate in a first direction relative to each other. The rotating unit and the housing can rotate in a second direction relative to each other, where the first direction is substantially perpendicular to the second direction. The up-shifting switch is disposed at a first side of the base member, while the down-shifting switch is disposed at a second side of the base member substantially opposite the first side. In use, the up-shifting and down-shifting switches are selectively operated according to the movement of the shift-lever in the second direction.

BRIEF DESCRIPTION OF THE DRAWINGS

The accompanying drawings, which are incorporated in and constitute a part of the specification, illustrate an embodiment of the invention, and, together with the description, serve to explain the principles of the invention.

Preferred embodiments of the present invention will hereinafter be described in detail with reference to the accompanying drawings.

DETAILED DESCRIPTION OF THE PREFERRED EMBODIMENTS

Figure 1:
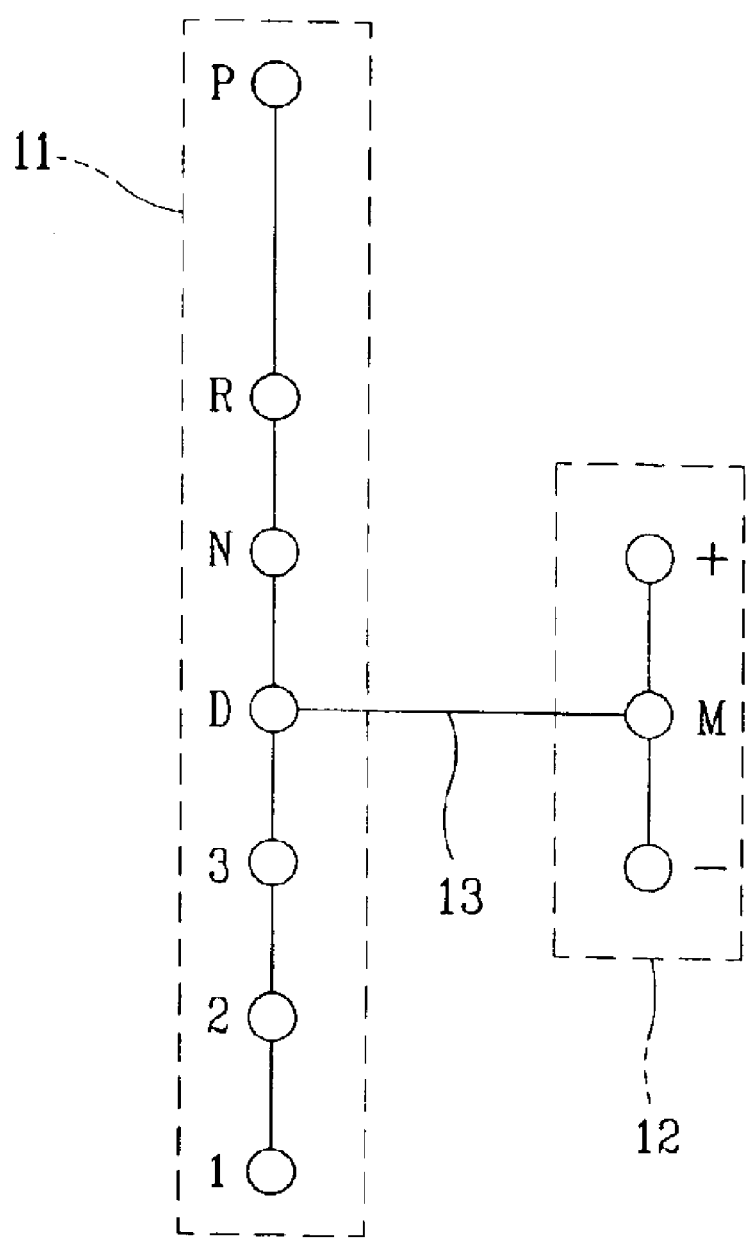
FIG. 1 is an example of a shift-lever operation pattern for an automatic transmission provided with a manual mode operation.

As shown in FIG. 1, a shift-lever apparatus for an automatic transmission provided with such a manual-mode function is provided with a manual-shift column 12. The manual-shift column 12 is connected to an ordinary shift column 11. Usually the manual shift column 12 is aligned in parallel with the ordinary shift column 11 and connected to the same at a "D" shift-lever position by a gate (usually called a manual gate) 13.

If a shift lever is located at the "D" position, the automatic transmission changes shift-speeds according to predetermined shift patterns, however, if the shift lever is moved to the manual shift column 12, the automatic transmission changes shift-speeds according to a driver's manual shifting. For example, the gears are upshifted when the shift lever is moved to the "+" position, or downshifted when the shift lever is moved to the "−" position. The requests for upshifting and downshifting are sensed by manual mode switches.

Figure 2:
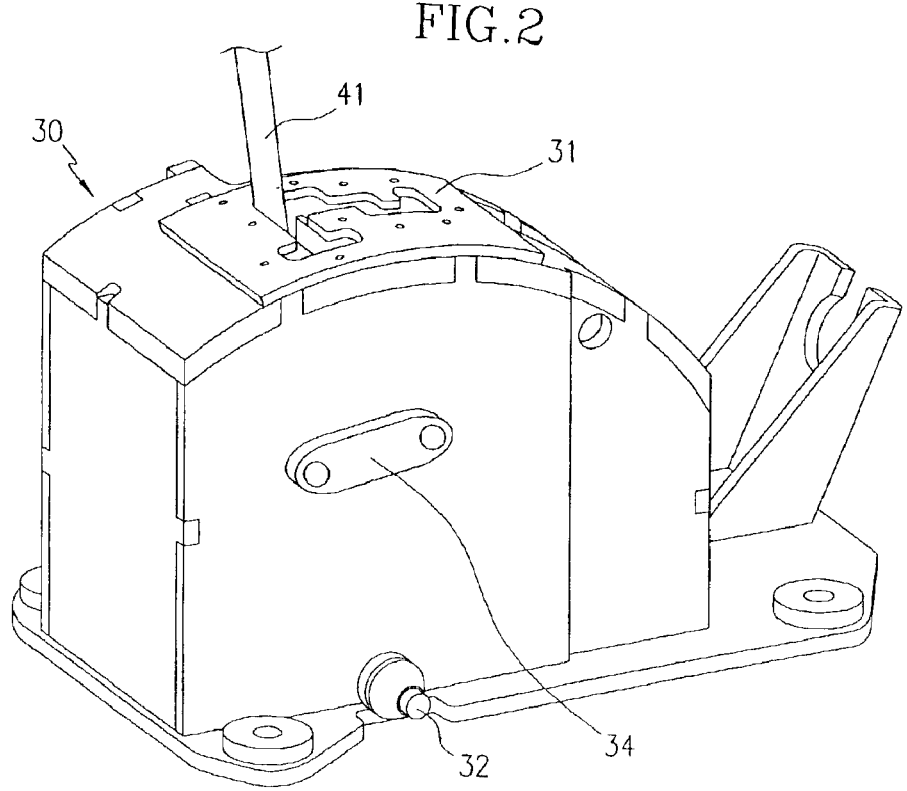
FIG. 2 is a perspective exterior view of a shift-lever apparatus of an automatic transmission according to a preferred embodiment of the present invention.
Figure 3:
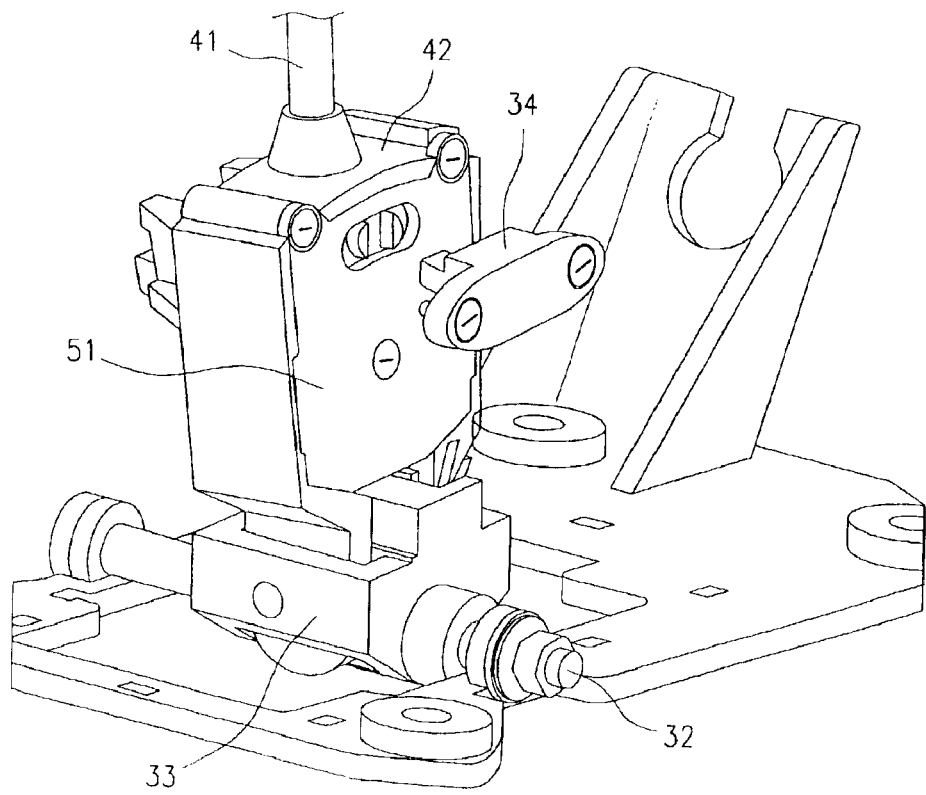
FIG. 3 is a perspective interior view of a shift-lever apparatus of an automatic transmission according to a preferred embodiment of the present invention having a housing thereof disassembled.
Figure 4:
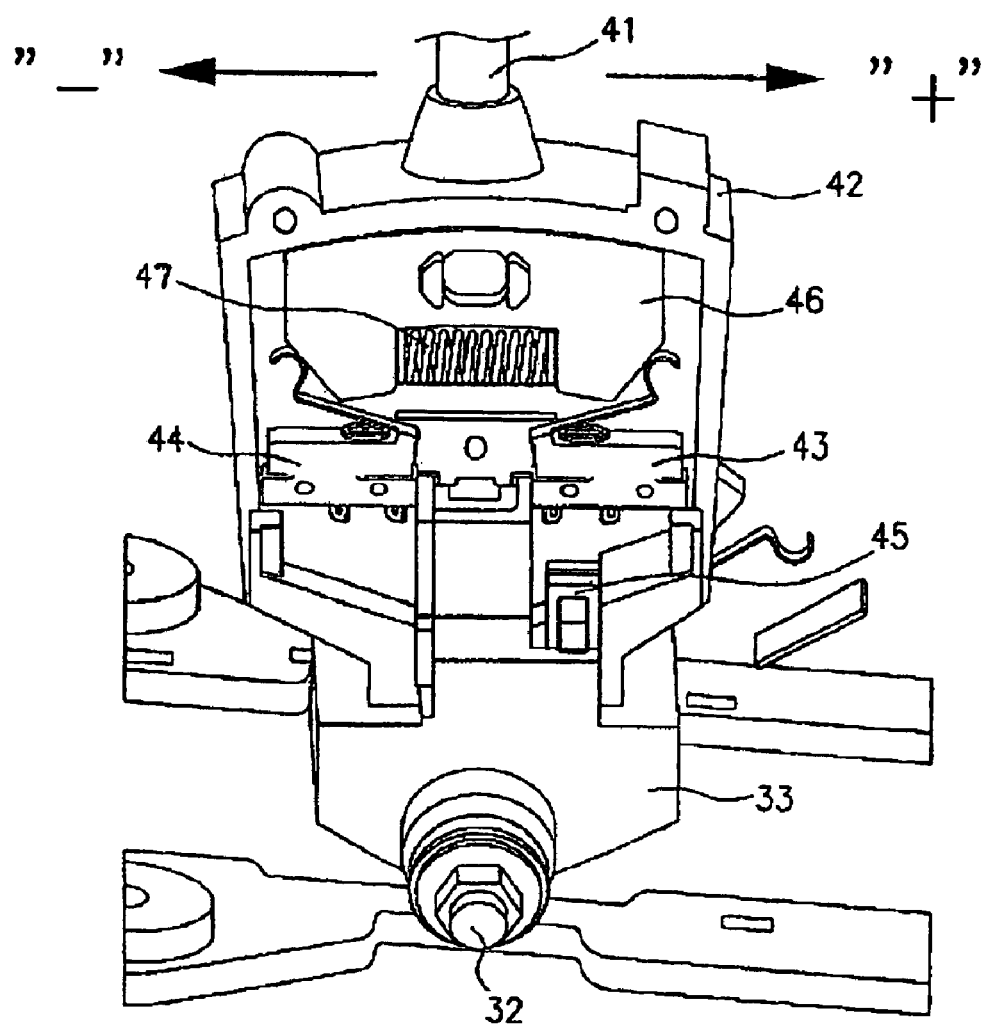
FIG. 4 illustrates operation of a shift-lever apparatus of an automatic transmission according to a preferred embodiment of the present invention, having a cover disassembled.
Figure 5:
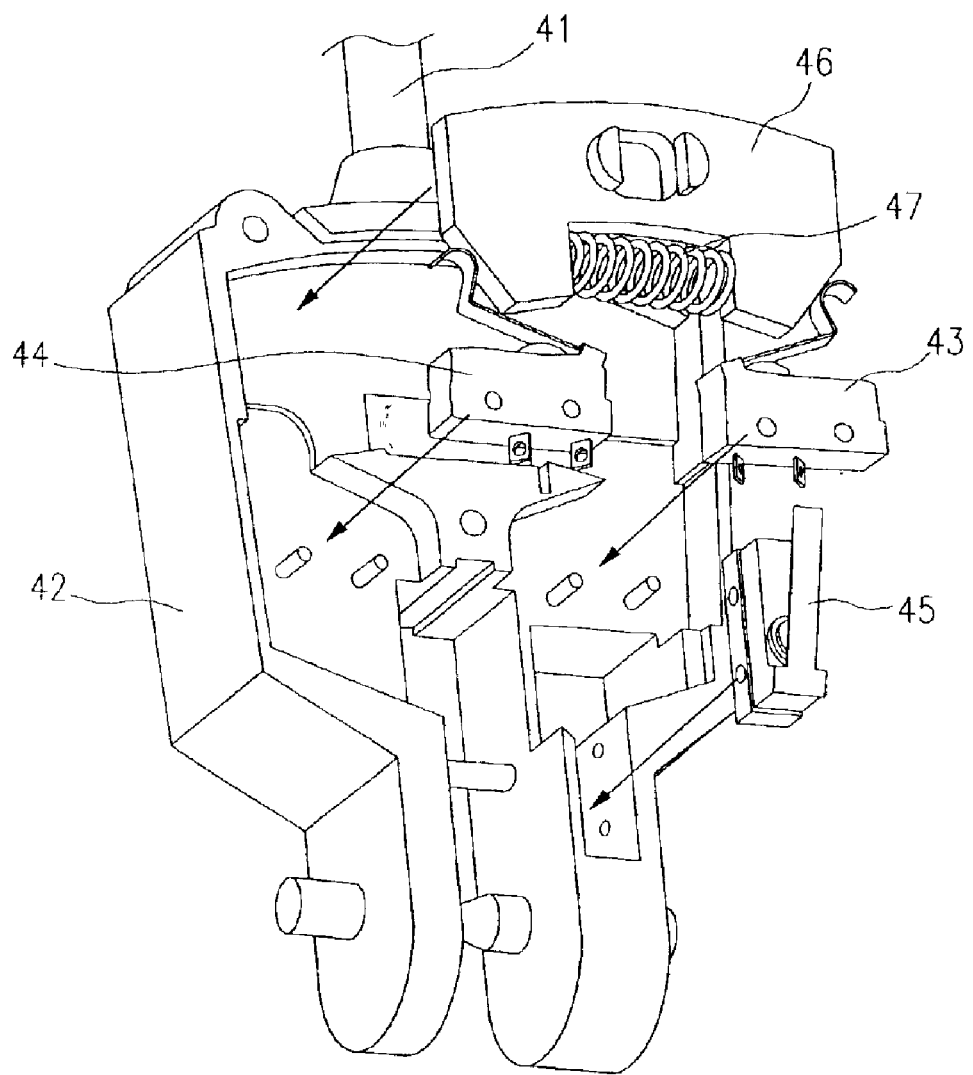
FIG. 5 is an exploded view for showing connections of principal components shown in FIG. 4.

Referring to FIG. 2, a shift-lever apparatus according to the invention includes an indicator 31 at the uppermost portion and a housing 30 for containing all components including a shift-lever 41. As shown in FIGS. 3 and 4, the shift-lever 41 is connected to a rotating unit disposed at a lower portion of the housing 30, such that the shift-lever 41 can rotate about the rotating unit. The shift-lever apparatus also includes a base member 42 fixed to the shift-lever 41 and enclosed by the housing 30, such that the base member 42 moves according to the movement of the shift-lever 41. Further, the shift-lever apparatus includes "+" and "−" switches 44 and 43 (see also FIG. 5) each being disposed at either side of the base member 42, such that the "+" and "−" switches 44 and 43 are selectively operated according to the movement of the shift-lever 41. A switch operating unit is disposed at the base member 42 such that the switch operating unit selectively presses the "+" and "−" switches 44 and 43. A manual mode switch 45 is disposed at the base member 42, such that the manual mode switch 45 operates in the manual mode.

The rotating unit includes a hinge shaft 32 mounted at a lower portion of the housing 30 in a direction perpendicular to shifting motion of the shift-lever 41. The rotating unit also includes a base block 33 rotatably supported by the hinge shaft 32 and for rotatably supporting the base member 42.

The switch operating unit includes a pressing plate 46, mounted to an upper portion of the base member 42. The pressing plate 46 is configured to selectively press the "+" and "−" switches 44 and 43 according to movement of the shift-lever 41. The switch operating unit also includes a spring 47, mounted at the pressing plate 46, for providing a restoring force thereto.

The pressing plate 46 is mounted to the base member 42 such that relative motion therebetween, for example, in the direction of arrows shown in FIG. 4, is enabled. The spring 47 is abutted by both the base member 42 and the pressing plate 46, such that the spring 47 generates a restoring force to diminish the relative displacement of the pressing plate 46 and the base member 42. The relative motion of the pressing plate 46 is guided by an arc-shaped inner wall 61 of the base member 42. Furthermore, in order to limit the relative movement between the pressing plate 46 and the housing 30, a locking member 34, fixed to the housing 30, penetrates the pressing plate 46.

The above described components are enclosed by a cover 51 as shown in FIG. 3. That is, the cover 51 is attached to the base member 42 such that the "+" and "−" switches 44 and 43, the switch operating unit, and the manual mode switch 45 are securely covered.

The operation of the shift-lever apparatus of a preferred embodiment of the present invention is hereinafter described, while operations also featured by a conventional shift-lever apparatus will not be explained, as they are well known to those skilled in the art.

As can be gathered from the drawings, the components for enabling manual mode operation are preferably modularized. That is, firstly, the base member 42 is unified with the shift-lever 41. Secondly, the "+" and "−" switches 44 and 43, the pressing plate 46, the spring 47, and the manual mode switch 45 are installed within the base member 42 and covered by the cover 51. The base member 42 is rotatably connected to the base block 33 which is also rotatably connected to the hinge shaft 32. Therefore, the shift-lever 41 can rotate left-and-right (as shown by the arrows in FIG. 4).

When the shift-lever 41 is moved in the "+" direction in FIG. 4, the "+" switch 44 moves along with the base member 42 fixed to the shift-lever 41 whereas the movement of pressing plate 46 is limited by the locking member 34. Accordingly, the pressing plate 46 presses and activates the "+" switch 44.

When the moving force applied to the shift-lever 41 is released, activation of the "+" switch 44 of the pressing plate 46 is released by the restoring force of the spring 47.

In the same way, when the shift-lever 41 is moved in the "−" direction, the pressing plate 46 activates the "−" switch 43. Activation of the "−" switch 43 is released by the restoring force of the spring 47 when the moving force in the "−" direction is released.

Accordingly, components for enabling manual mode operation are modularized. Therefore, the total size for a shift-lever apparatus can be reduced and the productivity in assembly increased, which consequently reduces manufacturing costs. Noise is reduced because the components operate within such a module. Furthermore, electric contact failure can be minimized because the assembly is stable.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A shift-lever apparatus of an automatic transmission for enabling manual mode operation, the shift-lever apparatus comprising:
   a housing;
   a shift-lever connected to a rotating unit disposed at a lower portion of the housing, such that the shift-lever can rotate about the rotating unit;
   a base member fixed to the shift-lever and enclosed by the housing such that the base member moves with movement of the shift-lever;
   manual mode shift switches respectively fixed to the base member at either side of the base member such that said switches are selectively operated by movement of the shift-lever; and
   a switch operating unit disposed at the base member such that the switch operating unit selectively presses said switches.

2. The apparatus of claim 1, further comprising a manual mode switch disposed at the base member such that the manual mode switch selects a manual mode.

3. The apparatus of claim 1, wherein the rotating unit comprises:
   a hinge shaft mounted at a lower portion of the housing in a direction perpendicular to movement of the shift-lever; and
   a base block rotatably supported by the hinge shaft for rotatably supporting the base member.

4. The apparatus of claim 1, wherein the switch operating unit comprises:
   a pressing plate, mounted to an upper portion of the base member, for selectively pressing the shift switches according to left and right movement of the shift-lever; and
   a spring, mounted at the pressing plate, for providing a restoring force to the pressing plate.

5. The apparatus of claim 4, further comprising a locking member fixed to the housing and penetrating the pressing plate.

6. The apparatus of claim 1, further comprising a cover mounted to the base member for covering the shift switches and the switch operating unit.

7. A shift-lever apparatus of an automatic transmission comprising:
   a housing;
   a shift-lever rotatably mounted to the housing, being rotatable in a predetermined direction;
   a base member fixed to the shift-lever;
   first and second switches fixed to the base member apart from each other in the predetermined direction;
   a pressing member mounted on the base member between the first and second switches such that a relative motion between the pressing member and the base member is enabled;
   an elastic member, abutted by both the pressing member and the base member, for providing a restoring force to diminish the relative movement between the pressing member and the base member; and
   a locking member for limiting a relative movement between the pressing member and the housing.

8. A shift-lever apparatus of an automatic transmission for enabling manual mode operation, the shift-lever apparatus comprising:
   a housing;
   a shift-lever;
   a base member coupled to the shift-lever within the housing, where the base member is configured to translate along with the shift-lever;
   a rotating unit rotatably coupled to both a lower portion of the housing and to said base member, such that said rotating unit and said base member can rotate in a first direction relative to each other, and said rotating unit and said housing can rotate in a second direction relative to each other, where said first direction is substantially perpendicular to said second direction;
   an up-shifting switch fixed at a first side of the base member;
   a down-shifting switch fixed at a second side of the base member substantially opposite said first side, such that the up-shifting and down-shifting switches are selectively operated according to the movement of the shift-lever in said second direction.

9. The apparatus of claim 8, further comprising a switch operating unit disposed at the base member such that the switch operating unit selectively presses the up-shifting and down-shifting switches.

10. The apparatus of claim 9, further comprising a manual mode switch disposed at the base member such that the manual mode switch selects the manual mode.

11. The apparatus of claim 9, wherein the rotating unit comprises:
    a hinge shaft mounted at a lower portion of the housing in a direction perpendicular to the second direction; and
    a base block rotatably supported by the hinge shaft and for rotatably supporting the base member.

12. The apparatus of claim 9, wherein the switch operating unit comprises:
    a pressing plate, mounted to an upper portion of the base member, for selectively pressing said switches according to left and right movement of the shift-lever; and
    a spring, mounted at the pressing plate, for providing a restoring force to the pressing plate.

13. The apparatus of claim 12, further comprising a locking member fixed to the housing and penetrating the pressing plate.

14. The apparatus of claim 9, further comprising a cover mounted to the base member for covering the up-shifting and down-shifting switches and the switch operating unit.

* * * * *